June 30, 1959 E. E. KLAHR ET AL 2,892,330
METHODS OF PRODUCING ORNAMENTED KNITTED FABRICS
Filed Oct. 4, 1955 11 Sheets-Sheet 1

INVENTORS:
Edwin E. Klahr, &
George R. Stafford, deceased,
Veronica H. Stafford, Administratrix,
BY Paul & Paul
ATTORNEYS.

June 30, 1959 E. E. KLAHR ET AL 2,892,330
METHODS OF PRODUCING ORNAMENTED KNITTED FABRICS
Filed Oct. 4, 1955 11 Sheets-Sheet 4

INVENTORS:
Edwin E. Klahr, &
George R. Stafford, deceased,
Veronica H. Stafford, Administratrix,
BY
ATTORNEYS.

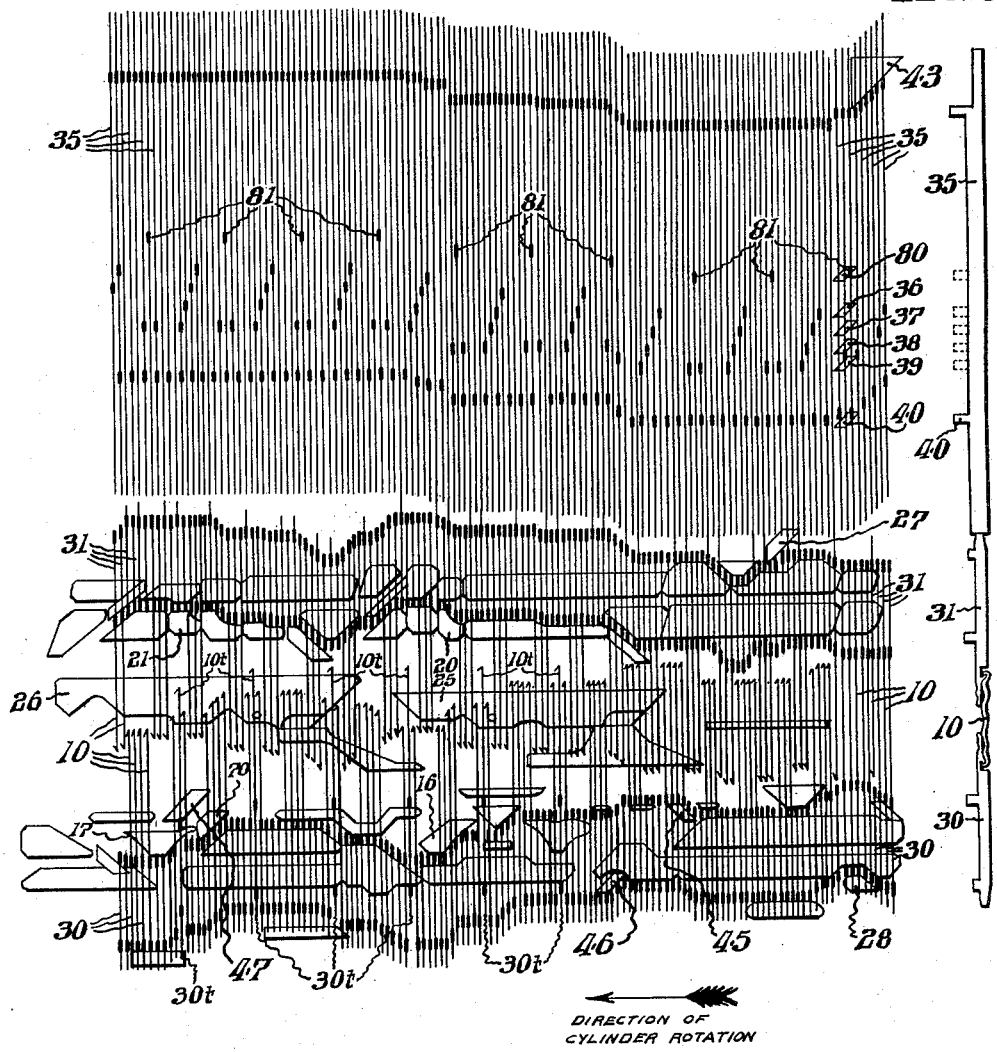

June 30, 1959  E. E. KLAHR ET AL  2,892,330
METHODS OF PRODUCING ORNAMENTED KNITTED FABRICS
Filed Oct. 4, 1955  11 Sheets-Sheet 6
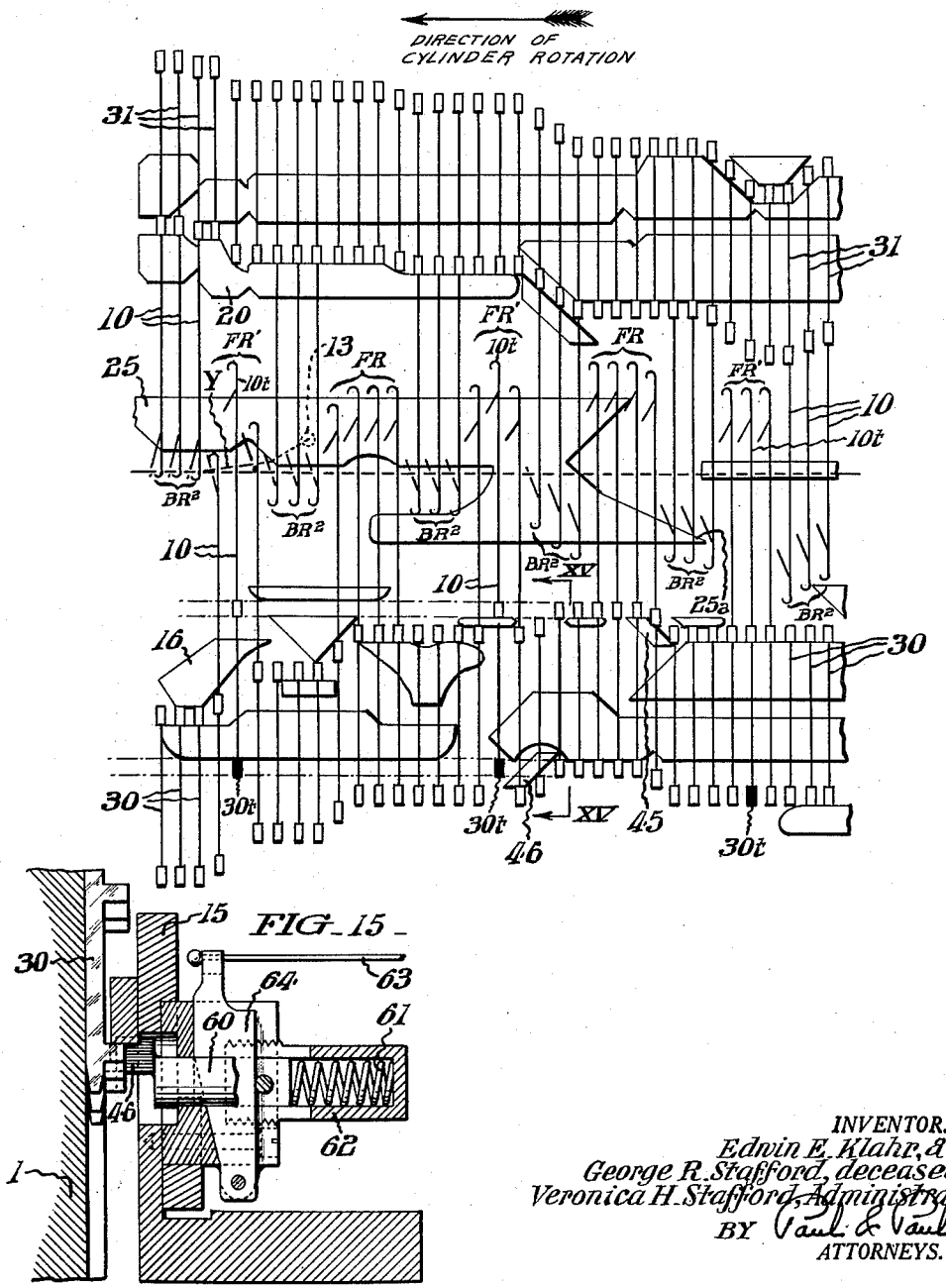

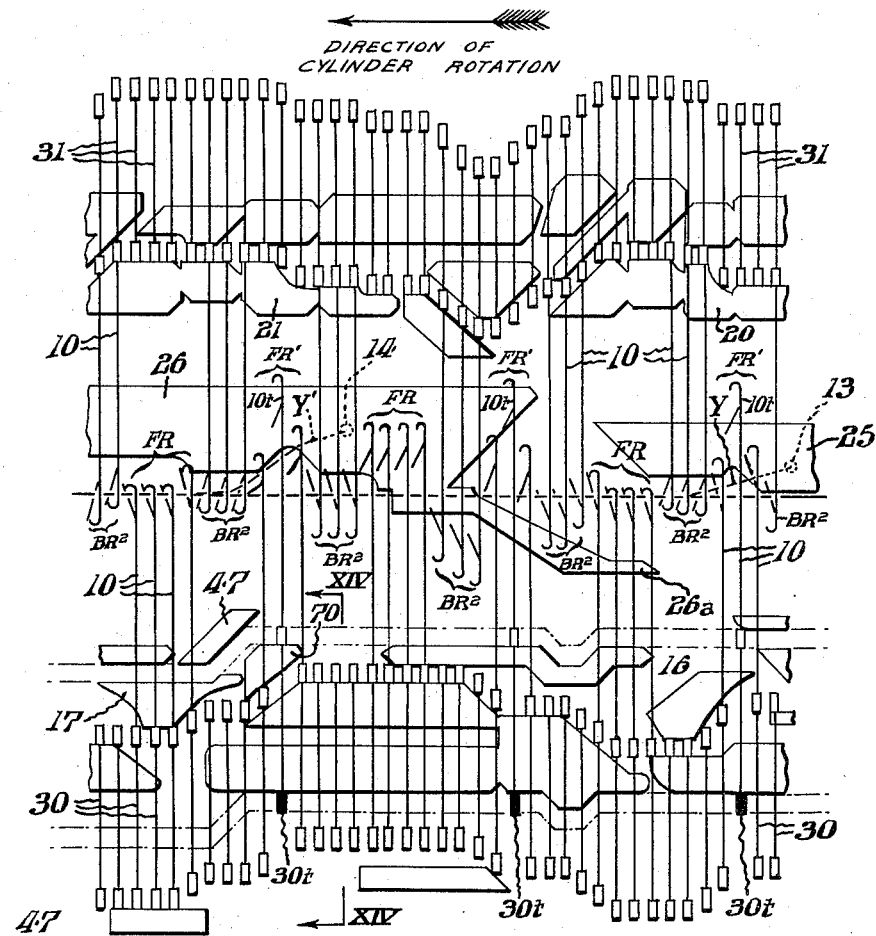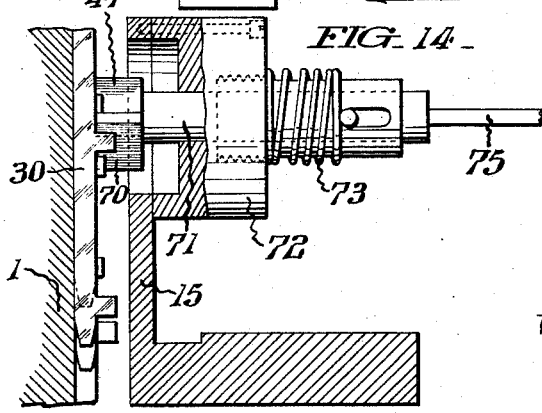

June 30, 1959  E. E. KLAHR ET AL  2,892,330
METHODS OF PRODUCING ORNAMENTED KNITTED FABRICS
Filed Oct. 4, 1955  11 Sheets-Sheet 8
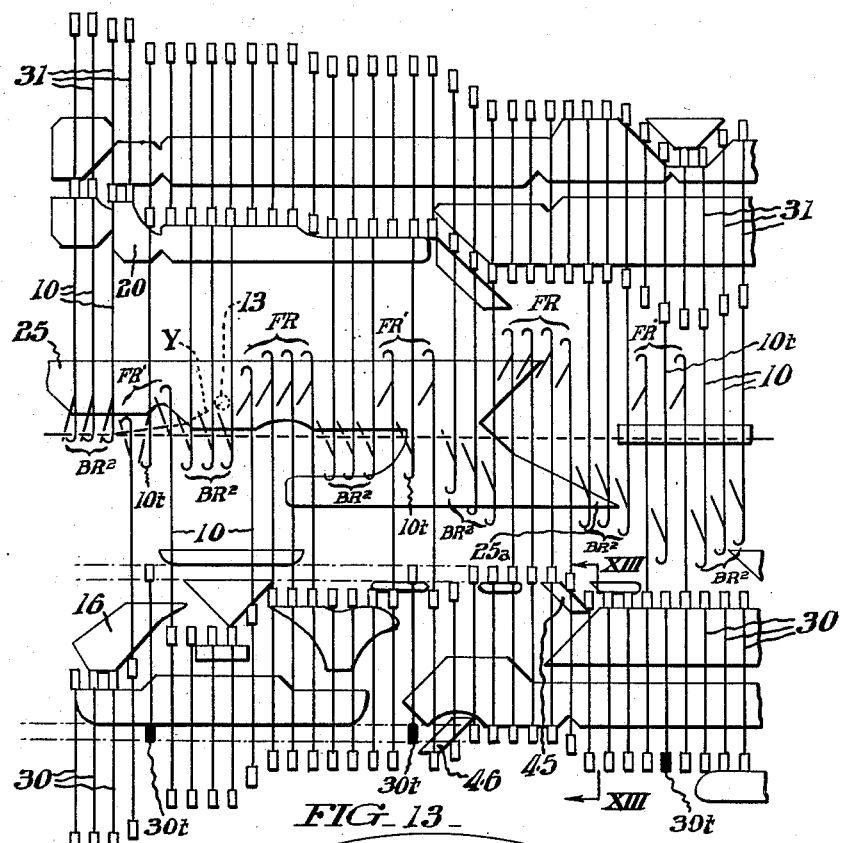
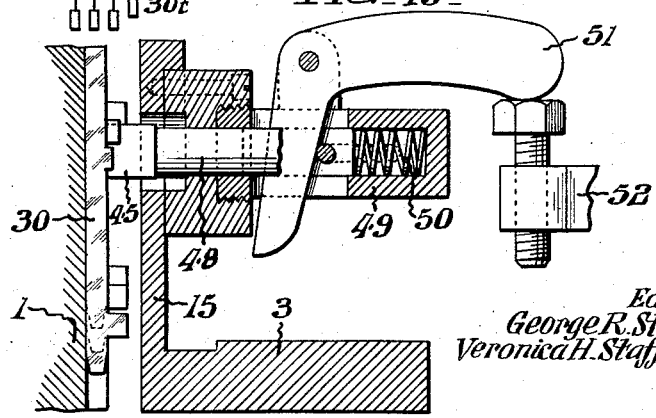
INVENTORS:
Edwin E. Klahr, a
George R. Stafford, deceased,
Veronica H. Stafford, Administratrix,
BY Paul & Paul
ATTORNEYS.

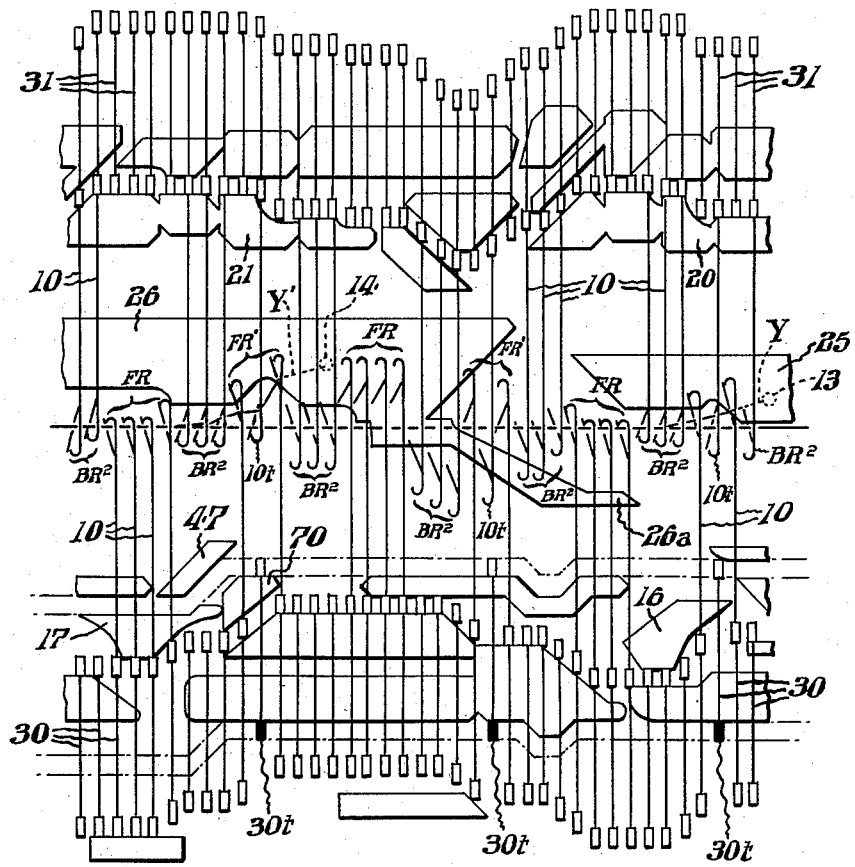

June 30, 1959  E. E. KLAHR ET AL  2,892,330
METHODS OF PRODUCING ORNAMENTED KNITTED FABRICS
Filed Oct. 4, 1955  11 Sheets-Sheet 10

INVENTORS:
Edwin E. Klahr, &
George R. Stafford, deceased,
Veronica H. Stafford, Administratrix,
BY Paul & Paul
ATTORNEYS.

DIRECTION OF KNITTING

DIRECTION OF KNITTING

DIRECTION OF KNITTING

INVENTORS:
Edwin E. Klahr, &
George H. Stafford, deceased,
Veronica H. Stafford, Administratrix,
BY Paul & Paul
ATTORNEYS.

United States Patent Office 2,892,330
Patented June 30, 1959

2,892,330

METHODS OF PRODUCING ORNAMENTED KNITTED FABRICS

Edwin E. Klahr, Kenhorst, Pa., and George R. Stafford, deceased, late of Reading, Pa., by Veronica H. Stafford, administratrix, Reading, Pa., assignors to Camp and McInnes, Inc., Reading, Pa., a corporation of Pennsylvania Application October 4, 1955, Serial No. 538,377

4 Claims. (Cl. 66—14)

This invention relates to methods of producing ornamented knitted fabrics. More particularly, it is concerned with the production of rib kitted fabrics including stockings such as are ordinarily produced or knitting machines of the well known so-called "Links-Links" or "Komet" types having double ended needles which are capable of being shifted between coaxial cylinders.

The chief aim of our invention is to provide a method of producing knitted fabric or stockings in which the ornamentation is formed by tuck stitches which are more prominent in their effect from the standpoint of enhancing the ornamentation than tuck stitches as ordinarily formed; and to make possible, through a relatively simple manipulation of the needles used in the tucking, the production of fabric or stockings so characterized, upon knitting machines of the kind referred to.

How these objectives are realized in practice will appear from the following detailed description of the attached drawings, wherein:

Fig. 5 is a view showing in linear development, the knitting needles in the machine and the means by which the needles are selected and actuated.

Fig. 6 is a detail view showing one of the needles with its associated slider and associated selector.

Figs. 7 and 8 taken together show the development of Fig. 5 on a larger scale.

Figs. 9 and 10 taken together are views similar to Figs. 6 and 7 showing how the tucking needles are actuated to form the ornamental stitches.

Figure 4:
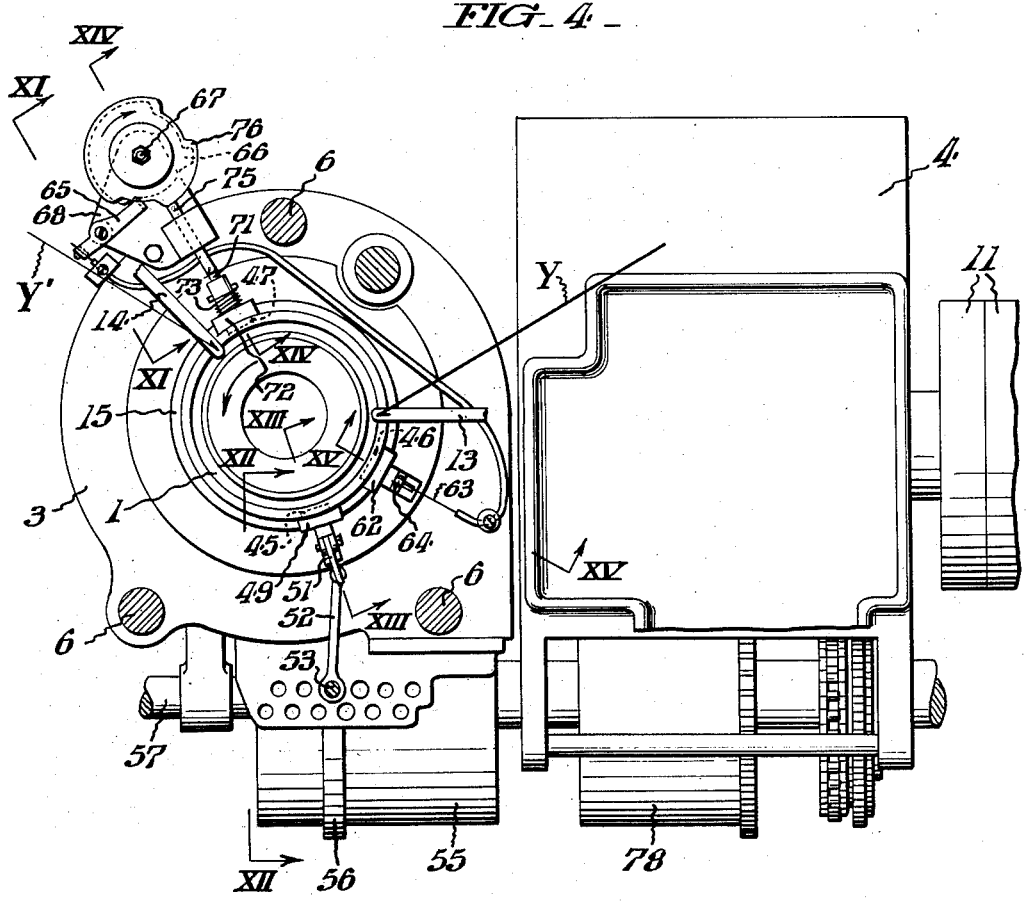
Fig. 4 is a horizontal section taken as indicated by the angled arrows IV—IV in Fig. 3.
Figure 11:
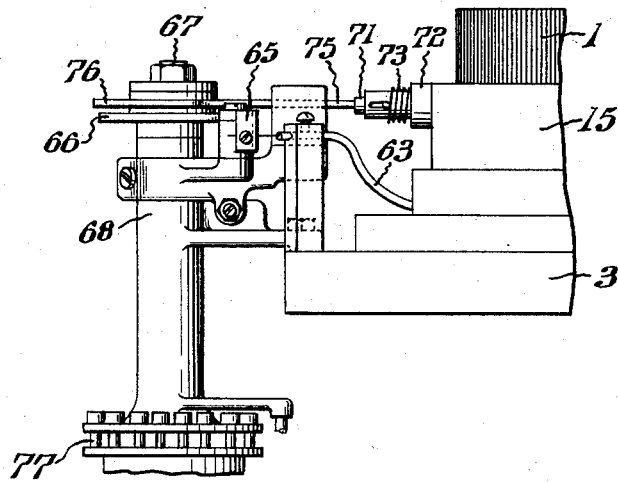
Figure 12:
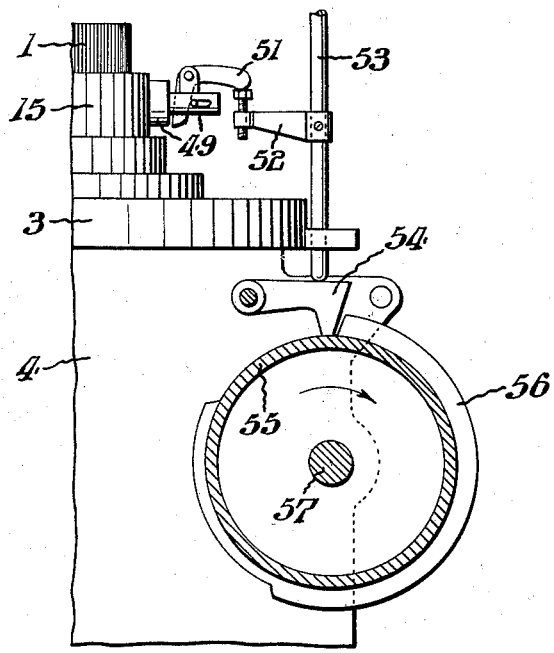

Figs. 11 and 12 are fragmentary detail views taken as indicated by the angled arrows XI—XI and XII—XII in Fig. 4.

Fig. 13 is a fragmentary view in section taken as indicated by the angled arrows XIII—XIII in Figs. 4 and 9, and drawn to a larger scale.

Fig. 14 is a fragmentary view likewise drawn to a larger scale and taken as indicated by the angled arrows XIV—XIV in Figs. 4 and 8.

Fig. 15 is a view in turn drawn to a larger scale and taken as indicated by the angled arrows XV—XV in Figs. 4 and 7.

Figure 16:
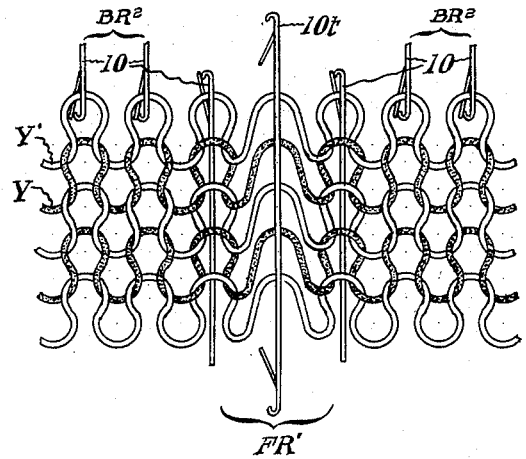
Figure 17:
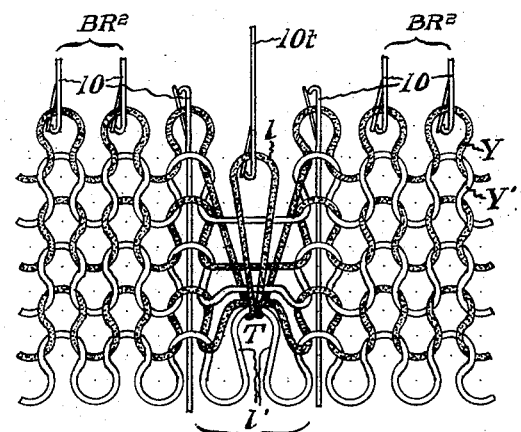
Figure 18:
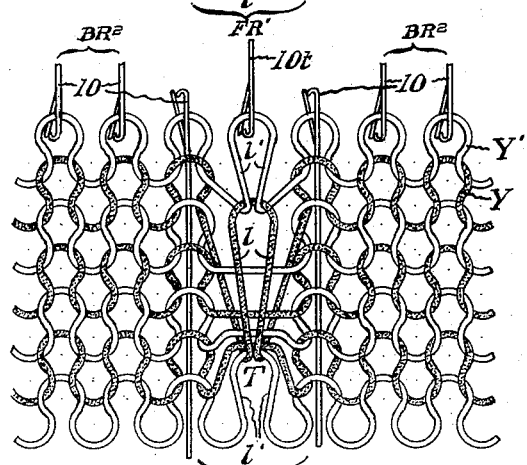

Figs. 16, 17 and 18 are illustrations showing successive steps in the formation of the tuck stitch ornamentation, with the fabric viewed from the back or reverse side.

Figure 1:
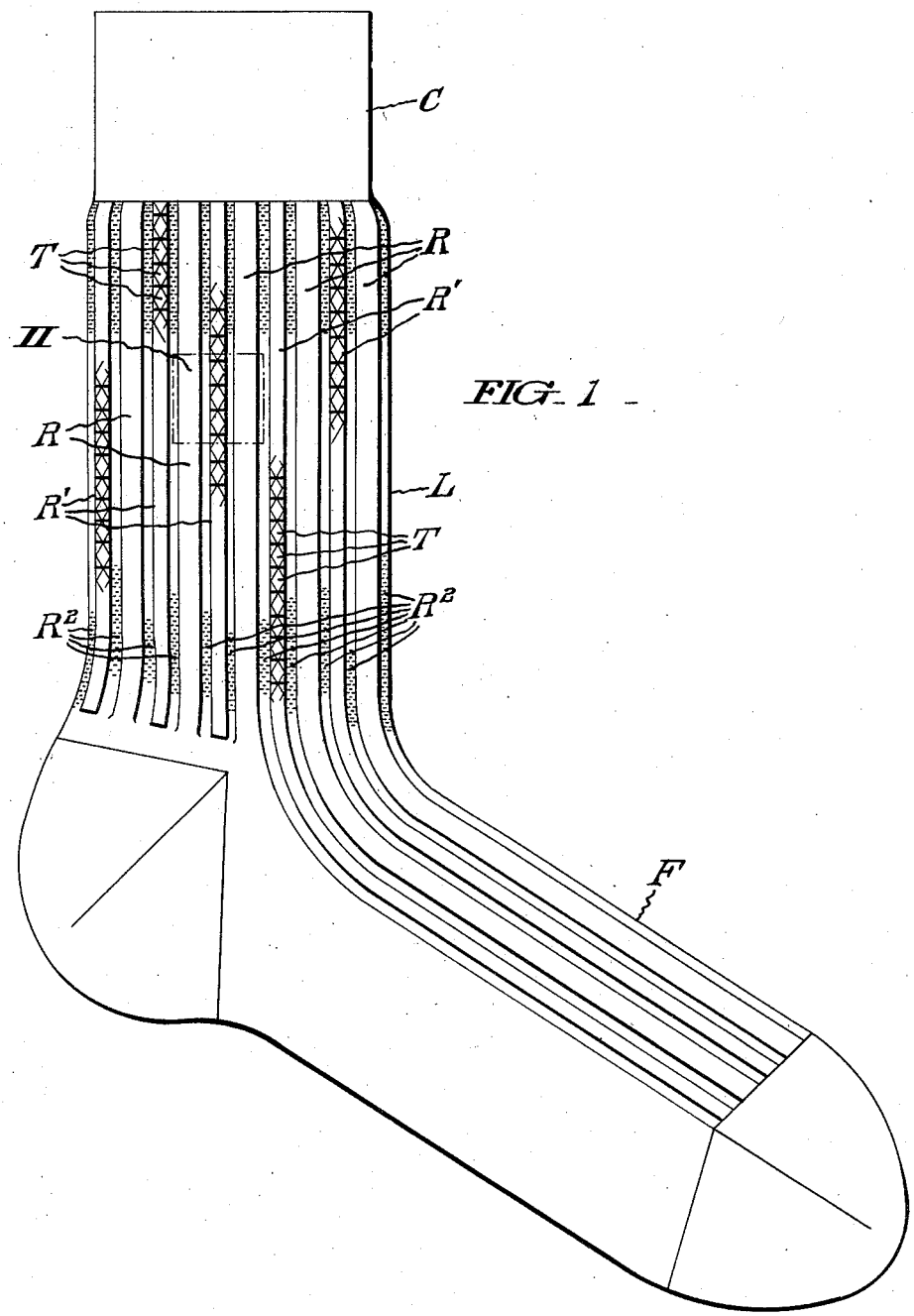
Fig. 1 is a view in side elevation of a tubular fabric in the form of a stocking ornamented in accordance with our invention.
Figure 2:
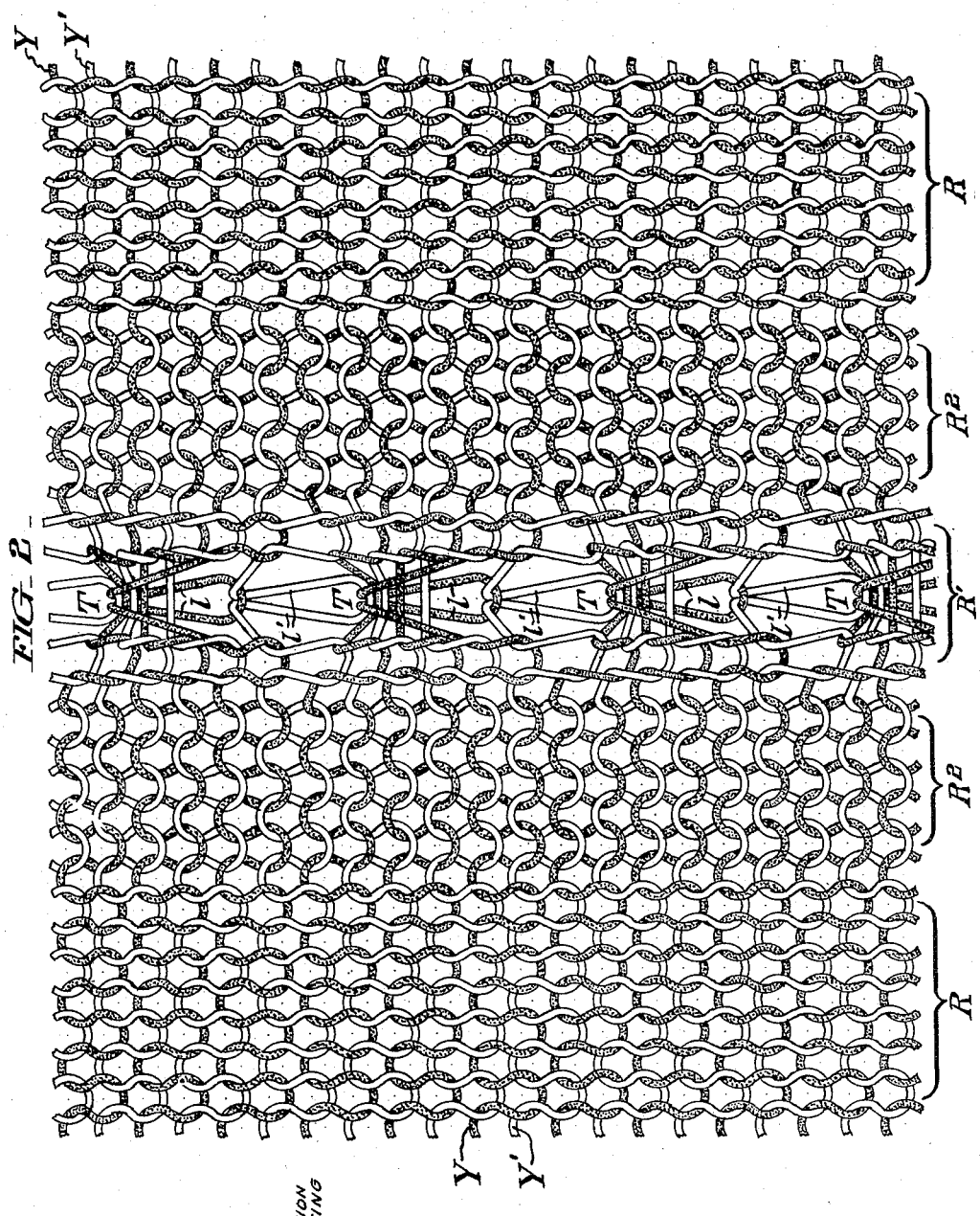
Fig. 2 is a fragmentary view on a larger scale showing the interloopment of the yarns in the ornamented area of the stocking fabric within the broken line rectangle II in Fig. 1.

As exemplified in Fig. 1, the stocking has a top cuff C, and its leg portion L has face ribs R in alternation with narrower face ribs R' which are ornamented by tuck stitches T, and back ribs R² intervening said face ribs. From Fig. 2 it will be noted that alternate courses of the fabric are formed from contrasting yarns Y and Y' which may be black and white respectively, the face ribs R being of four wale width, the face ribs R' of three wale width with the tuck stitches T in the center wale, and the back ribs R² of three wale width, the tucking being done in groups of four consecutive courses, with incidental formation from the yarn of relatively long loops 1 and 1' of which the side portions appear prominently at the outer face of the fabric to create the ornamental effect. As shown, the ribbing and the ornamentation may be extended downward of the top of the foot F. The heel and toe pockets of the stocking are formed by reciprocatory knitting from one of the yarns, Y, Y' and the sole may be plain knitted from both yarns in alternation.

For the production of stockings so ornamented, we utilize for example, a circular knitting machine having two coaxial cylinders in superposed relation, with suitable additions and modifications hereinafter described. Generally speaking, the illustrated machine is of well known construction, its coaxial lower and upper cylinders being designated 1 and 2 respectively. The lower cylinder 1 is mounted for rotation in a bed 3 on the base frame 4 of the machine, and the upper cylinder 2 is mounted in an annulus 5 supported by posts 6 from said bed, and separated from said lower cylinder by a narrow knitting interval 7. The needles of the machine, generally designated by the numeral 10, are of the usual double ended hook and latch type and are shiftable individually or in groups between the cylinders for the purposes of ribbing the leg and instep portions of stocking. During knitting of the heel and toe pockets of the stocking, all the needles 10 of a segmental section of the series are transferred to the lower cylinder 1 while the remaining needles are displaced out of the range of the knitting cams in the usual well known way. By conventional drive mechanism of which only the pulleys are shown at 11, the cylinders 1 and 2 are rotated and oscillated in unison as required during the formation of the leg and the heel and toe pockets of the stocking. Substantially at diametrically opposite stations, the machine has main and auxiliary fingers 13 and 14 for feeding the contrasting or differently colored yarns Y and Y' to the needles, the yarn Y being represented by a heavy line and the yarn Y' by a thinner line in Figs. 3 and 4 for convenience of more ready distinction. The cams instrumental in the actuation of the needles while in the lower cylinder 1 are carried by a surrounding ring 15 which is fixed upon the bed 3, said cams including the usual main and auxiliary stitch cams 16 and 17 (Figs. 5-7) respectively located in the regions of the feed fingers 13 and 14.

The cams instrumental in the actuation of the needles while in the upper cylinder 2 likewise include the usual main and auxiliary stitch cams 20 and 21 respectively located in the region of the main and auxiliary feeds and mounted on a surrounding ring 22 fixed upon the annulus 5. Except as later on pointed out cams associated with the respective cylinders 1 and 2 are of conventional design. The usual needle latch guards designated 25 and 26 have projections 25a and 26a for opening the needle latches just prior to the arrival of the needles at the yarn feeding stations. At 27 and 28 in Fig. 5 are shown the usual transfer cams.

Figure 3:
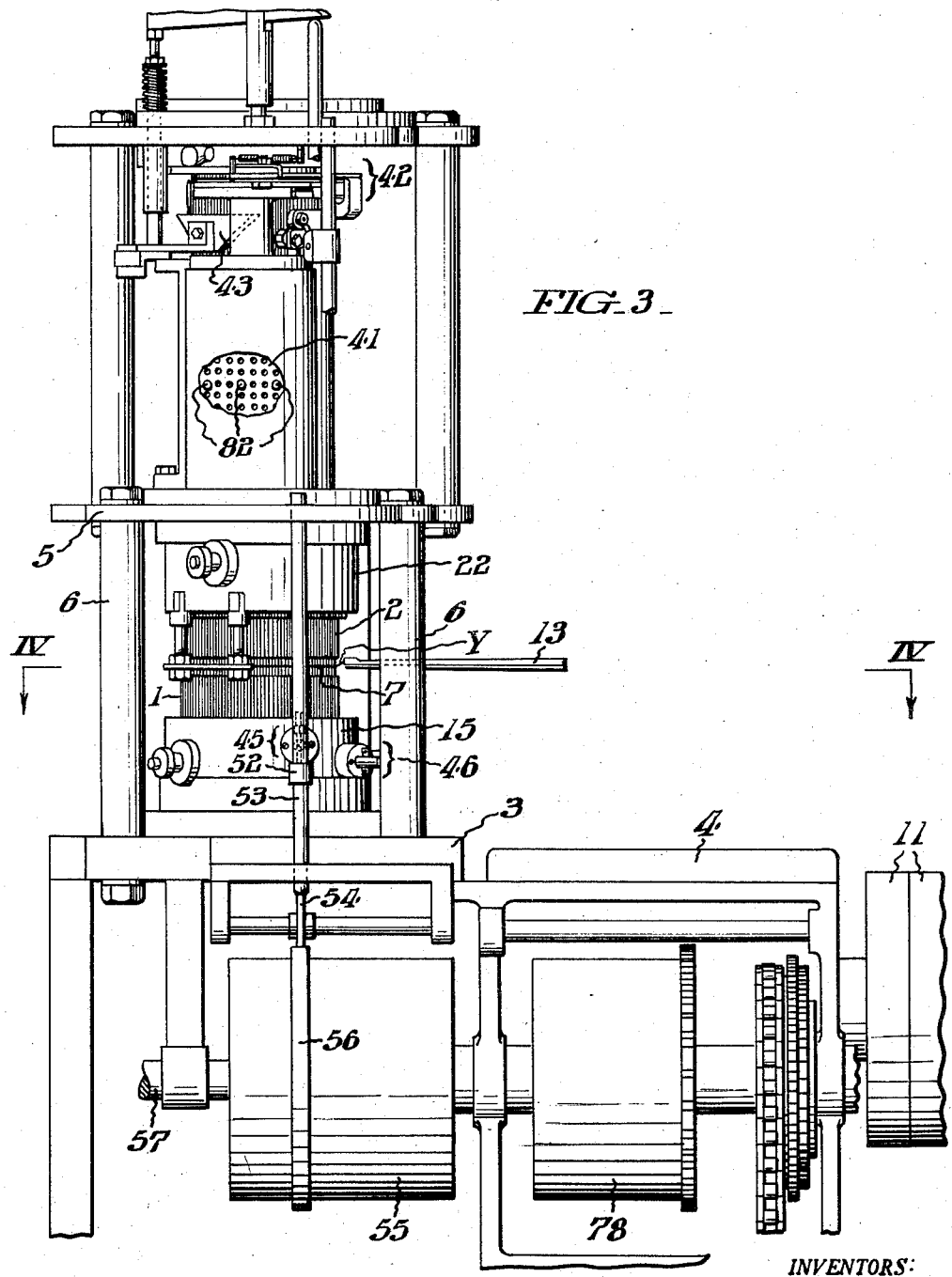
Fig. 3 is a skeletonized view, in front elevation, of a circular knitting machine organized for the production of the stocking in accordance with our new method.

While in the lower cylinder 1, the needles 10 are actuated through the usual double butt sliders designated 30 by the lower set of knitting cams, and while in the upper cylinder 2 through the usual double butt sliders designated 31, by the upper set of knitting cams. The selectors 35 (Figs. 5 and 6) in the grooves of the upper cylinder 2 above the sliders 31 have butts at different elevations actuated by vertically spaced depressing cams 36, 37, 38, 39 and 40 controlled in the usual way through interposed means (not illustrated) by a shielded vertical axis drum 41 (Fig. 3) which is mounted on the annulus 5 and arranged to be intermittently stepped about by the conventional means generally designated 42 in Fig. 3 one increment at a time during each rotation of the machine. As ordinarily, the cam shown at 43 in Figs. 3 and 5 is positioned to act upon the uppermost butts of the selectors 35 to level them.

In order to adapt a machine such as briefly described up to this point to carry out our improved method of knitting, we have provided amongst the cams associated with the lower cylinder 1, as shown in Figs. 3, 4, 5 and 7–10, three special cams 45, 46 and 47 respectively. The cam 45 is arranged to act upon the upper butts of the sliders 30 in the lower cylinder 1, said cam (see Figs. 4 and 13) being fixed upon the inner end of a rod 48 confined to endwise sliding movement radially of the cylinder in a guide bracket 49 fast on the ring 15 and pressed inwardly by a spring 50. The cam 45 is retractable by means of a bell crank lever 51 whereof the horizontal extremity is underreached by an arm 52 on a vertical slide rod 53 (see Figs. 3, 4 and 12). As shown, the rod 53 rests upon a pivoted finger 54 which in turn, rests upon a drum 55 having a stepped cam ridge 56. The drum 55 is mounted upon the main drum shaft 57 of the machine and, during each stocking knitting cycle, is intermittently turned through a complete revolution.

The special cam 46 (see Figs. 3, 4, 11 and 15) is similarly fixed upon the inner end of a rod 60 constrained to axial movement radially of the cylinder 1 in another bracket 62 secured to the ring 15 and is pressed inwardly by a spring 61. The cam 46 is retractable by means of a lever 64 which, through a "Bowden" wire 63, is connected to a pivoted finger 65 bearing upon a rotary vertical axis edge cam 66. As shown in Figs. 4 and 11 the disk cam 66 is secured to the top end of a usual shaft 67 of the machine journalled in a fixed bracket 68 on the bed 3.

The special cam 47 (see Figs. 3, 4, 11 and 14) is fixed together with the usual depressing cam 70, upon the inner end of still another slide rod 71 which is constrained to axial movement in a radial boss 72 on the cam ring 15 and is yieldingly urged outwardly by a spring 73. A slide bar 75 fits against the slide 71 and bears against the edge of a disk cam 76 affixed to the upper end of the shaft 67 above the aforementioned disk cam 66. The ratchet wheel 77 at the bottom of the shaft 67 is arranged to be picked, under control of the main pattern drum 78 of the machine through mechanism such as disclosed in U.S. Patent No. 2,045,938.

For the purposes of our invention, we have additionally provided a cam 80 (Fig. 5) which is adapted to act, as presently set forth, upon special butts 81 only on those of the selectors 35 associated with the sliders 31 for the tucking needles designated 10t, said cam being moved into active position when indicated by a row of special studs 82 (Fig. 3) in uniformly-spaced relation on the design pattern drum 41.

Also in accordance with our invention, the sliders 30t in the lower cylinder 1 asociated with the tucking needles 10t are provided with short lower butts indicated in Figs. 7–10 as solid black rectangles, and the sliders 30 for all of the remaining needles are provided with long butts which, in Figs. 7–10, are indicated as open rectangles.

*Operation*

The cuff C of the stocking of Fig. 1 is knitted as 1 x 1 rib fabric with alternate needles operating in the lower cylinder 1 and with the intermediate needles operating in the upper cylinder 2. In preparation for knitting of the leg portion L at the completion of the stocking cuff C, the needles are re-subdivided between the lower and upper cylinders 1 and 2 as shown in Figs. 5 and 7, 8, those relegated to the lower cylinder being arranged in groups FR and FR' of four and three needles in alternation to produce the front and back face ribs R and R' of the fabric, and those in the upper cylinder being arranged in groups BR² of three needles each between the groups FR and FR' to produce the back ribs R² of the fabric, the center needle 10t of every group FR' being utilized for the tucking as presently explained. This re-subdivision of the needles is brought about in the usual well known manner under the control of the patterning drum 41 by which the cams 36—39 are advanced to act upon the selectors 35 having the variously arranged intermediate butts as will be readily understood from Fig. 5. For each patterning phase of the leg knitting, the tucking needles 10t remain in the lower cylinder 1 for two revolutions of the machine incident to which they receive the yarns Y and Y' as shown in Fig. 16 successively from the main and auxiliary feeds 13 and 14 without knitting them while all of the other needles in both cyilnders are actuated by the knitting cams to form loops from said yarns. During each of these two revolutions of the machine, it will be noted from Figs. 7 and 8 that all of the needles except the tucking needles 10t follow the usual knitting track through the knitting cams, being caused to take the yarn Y at the feed 13 and knit it as they are depressed by the main stitch cam 16, and later caused to take the yarn Y' at the feed 14 to knit said yarn as they are depressed by the auxiliary knitting cam 17. In this connection it is to be observed that, by action of the special cam 45 upon the upper butts of the sliders 30, all of the needles in the lower cylinder 1 will be slightly raised from the idle level to the latch clearing level, but before reaching the stitch cam 16, all of the needles, except the tucking needles 10t, are lowered by action of the special cam 46 upon the long lower butts of the sliders 30 associated with the first mentioned needles, which latter are therefore caused to follow the normal knitting track. The tucking needles 10t, by virtue of the short lower butts on the associated sliders 30, however pass by the special cam 46 and therefore remain at the tuck level as shown in Fig. 7 so as not to be depressed by the stitch cams 16 and 17. As the tucking needles 10t approach the auxiliary stitch cam 17, they are restored to the idle level by action of the special cam 47 upon the upper butts of the associated sliders 30. In the meantime, all of the needles then in the upper cylinder 2 follow the normal knitting path and are caused to knit the yarns Y and Y' in succession by action of the stitch cams 20 and 21 upon the lower butts with the slider associated with said needles. At the completion of the two revolutions of the machine, the tucking needles 10t are transferred to the upper cylinder 1 to remain there for one revolution of the machine incident to which they are actuated by the upper set of knitting cams to receive and knit the yarns Y and Y' in succession as shown in Figs. 17 and 18 for the formation of the long tie-in loops 1 and 1' of the tuck stitches T in Fig. 1. This cycle is repeated throughout the knitting of the leg portion of the stocking as well as of the top of the foot. Shifting of the tucking needles 10t from the lower cylinder to the upper cylinder is determined by action of the cam 80 upon the butts 81 of the selector 35 associated with said needles in accordance with the arrangement of pins 82 on pattern drum 41, these selectors being thereby depressed to engage said needles which are thereby lifted to the upper cylinder, likewise in the usual way, and locked with the sliders 31 for actuation by the upper set of knitting cams. The special cams 45, 46 as well as the connected cams 47, 70 are withdrawn during knitting of the heel and toe pockets of the stocking, and reintroduced of course to function during the ornamenting stage of the knitting.

While the preferred embodiment of this invention has been described in some detail, it will be obvious to one skilled in the art that various modifications may be made without departing from the invention as hereinafter claimed.

Having thus described our invention, we claim:

1. A method of producing ornamented rib fabric on a circular knitting machine having two coaxial cylinders, a complement of shiftable double-ended needles and a yarn feed, said method comprising the steps of relegating groups of at least three needles each in alternation to the respective cylinders to form the front and back face ribs of the fabric; feeding the yarn to all of the needles in both cylinders while maintaining individual needles of certain of the face wale rib forming needle groups in the one cylinder at the tucking level and forming regular loops on all of the other needles in both cylinders incident to knitting of multiple courses; and transferring such individual needles from the one cylinder to the other cylinder after knitting multiple courses and causing said individual needles to draw from the yarn, elongate back face rib wale loops in the front face ribs to bind together the yarn floats resulting from the tucks during the knitting of the multiple courses.

2. A method of producing ornamented rib fabric on a circular knitting machine having coaxial cylinders, a complement of shiftable double-ended needles and a yarn feed, said method comprising the steps of relegating groups each of an uneven number of needles in alternation to the respective cylinders; feeding the yarn to all of the needles in both cylinders to form front face and back face ribs while maintaining the center needles of certain of the front face rib forming needles in the one cylinder at the tucking level and forming regular loops on all of the other needles in both cylinders during the knitting of multiple courses; and transferring the aforesaid center needles from the one cylinder after knitting multiple courses to the other cylinder and causing said center needles to draw from the yarn, elongate back face rib loops from the yarn in the front face ribs to bind together the yarn floats resulting from the tucking during the knitting of the multiple courses.

3. A method of producing ornamented rib fabric on a circular knitting machine having two coaxial cylinders, a complement of shiftable double-ended needles and a pair of feeds respectively for contrasting yarns, said method comprising the steps of relegating groups of at least three needles each in alternation to the respective cylinders; feeding the yarn to all of the needles while maintaining individual needles centrally of certain of the face rib forming needles in one cylinder at the tuck level and forming regular loops on all of the remaining needles in both cylinders incident to knitting multiple courses; and transferring the individual needles from said one cylinder after knitting multiple courses to the other cylinder and causing them to draw elongate back face rib loops from the respective yarns at different times to bind together the yarn floats resulting from the tucking during knitting of the multiple courses.

4. A method of producing ornamented rib fabric on a circular knitting machine having two coaxial cylinders, a complement of shiftable double-ended needles and a pair of feeds respectively for contrasting yarns, said method comprising the steps of relegating groups of three needles each in alternation to the respective cylinders; feeding the yarn to all of the needles while maintaining the central needles of certain of the front face rib needles in one cylinder at the tuck level and forming regular loops on all of the remaining needles in both cylinders incident to knitting multiple courses; and transferring the aforesaid central needles from said one cylinder to the other cylinder and causing them to draw elongate back face rib loops from the respective yarns at different times to bind together the yarn floats resulting from the tucking during knitting of the multiple courses.

References Cited in the file of this patent

UNITED STATES PATENTS

| | | |
|---|---|---|
| 2,104,626 | Spiers et al. | Jan. 4, 1938 |
| 2,408,698 | Smith | Oct. 1, 1946 |
| 2,412,248 | Bristow | Dec. 10, 1946 |
| 2,442,442 | Shortland | June 1, 1948 |
| 2,464,126 | Fregeolle | Mar. 8, 1949 |
| 2,468,668 | Holmes | Apr. 24, 1949 |
| 2,573,117 | Thurston | Oct. 30, 1951 |
| 2,698,530 | Lerch et al. | Jan. 4, 1955 |
| 2,730,879 | Jette | Jan. 17, 1956 |

FOREIGN PATENTS

| | | |
|---|---|---|
| 244,462 | Germany | Mar. 9, 1912 |